(12) United States Patent
Passantino et al.

(10) Patent No.: US 11,361,332 B2
(45) Date of Patent: Jun. 14, 2022

(54) CONTINUAL AUDIENCE SYNCHRONIZATION

(71) Applicant: Adobe Inc., San Jose, CA (US)

(72) Inventors: Frank Passantino, San Mateo, CA (US); Arjun Nair, San Mateo, CA (US)

(73) Assignee: Adobe Inc., San Jose, CA (US)

(*) Notice: Subject to any disclaimer, the term of this patent is extended or adjusted under 35 U.S.C. 154(b) by 492 days.

(21) Appl. No.: 15/994,846

(22) Filed: May 31, 2018

(65) Prior Publication Data

US 2019/0333084 A1  Oct. 31, 2019

Related U.S. Application Data

(60) Provisional application No. 62/664,129, filed on Apr. 28, 2018.

(51) Int. Cl.
    *G06Q 30/02*     (2012.01)
    *G06Q 50/00*     (2012.01)

(52) U.S. Cl.
    CPC ..... *G06Q 30/0204* (2013.01); *G06Q 30/0269* (2013.01); *G06Q 30/0276* (2013.01); *G06Q 30/0277* (2013.01); *G06Q 50/01* (2013.01)

(58) Field of Classification Search
    None
    See application file for complete search history.

(56) References Cited

U.S. PATENT DOCUMENTS

| | | | |
|---|---|---|---|
| 2006/0136286 A1* | 6/2006 | Gupta | G06Q 30/02 705/7.32 |
| 2008/0077462 A1* | 3/2008 | Patel | G06Q 30/0237 705/7.33 |
| 2011/0106580 A1* | 5/2011 | Almeida | G06Q 30/0204 705/7.29 |
| 2015/0294349 A1* | 10/2015 | Capel | G06Q 30/0267 705/14.43 |
| 2016/0171557 A1* | 6/2016 | Fanous | G06F 16/955 705/14.66 |
| 2016/0371732 A1* | 12/2016 | Heiser, II | G06F 16/9535 |
| 2017/0178184 A1* | 6/2017 | Brill | G06Q 30/0277 |
| 2017/0330239 A1* | 11/2017 | Luo | H04L 67/42 |
| 2017/0345032 A1* | 11/2017 | Serboncini | G06Q 30/0204 |

* cited by examiner

*Primary Examiner* — Eric W Stamber
*Assistant Examiner* — Ashley Y Young
(74) *Attorney, Agent, or Firm* — Keller Preece PLLC

(57) ABSTRACT

A method and system for continual audience synchronization receives user input corresponding to criteria to create a targeted list of people. The system receives user input corresponding to a request to synchronize the targeted list of people with a corresponding audience on each of a number of content delivery networks. The system processes updates to add or remove entries from the targeted list of people based on the one or more criteria. In response to processing the updates, the system accesses each of the content delivery networks, through appropriate application programming interfaces, to update each corresponding audience. When a visitor who matches an entry in the corresponding audience accesses a webpage associated with one of the content delivery networks, the content delivery network selects content associated with the corresponding audience to be presented to the visitor and presents the selected content to the visitor as part of the webpage.

20 Claims, 6 Drawing Sheets

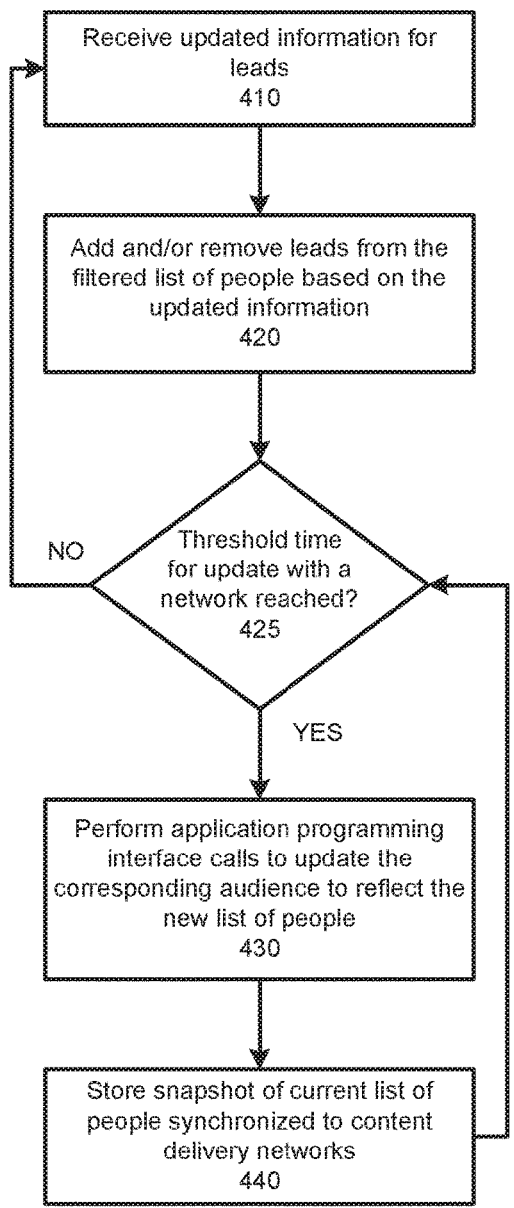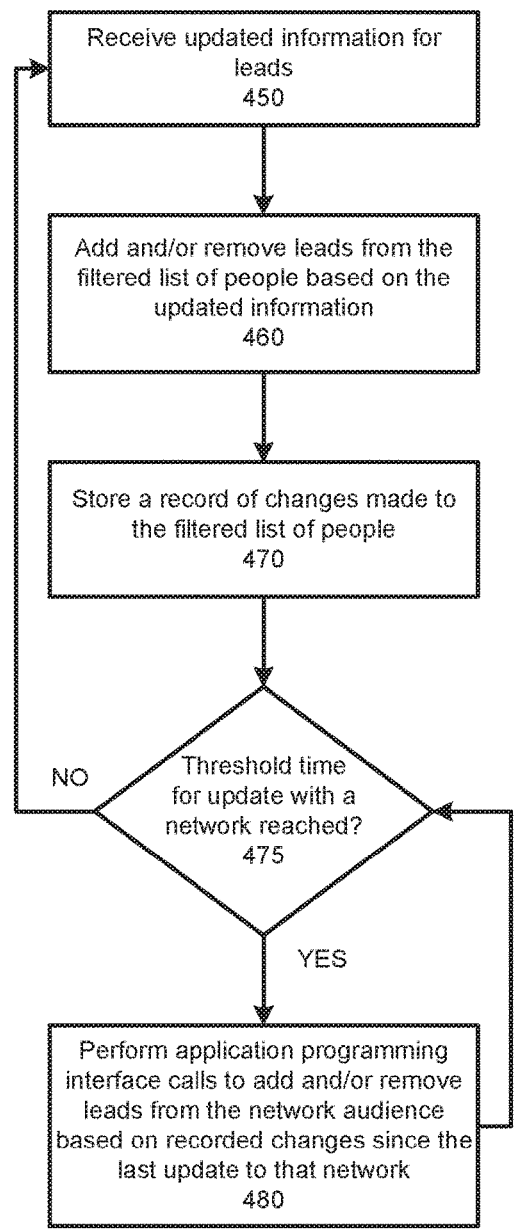
FIG. 4A
FIG. 4B

CONTINUAL AUDIENCE SYNCHRONIZATION

CLAIM OF PRIORITY

This application claims priority to U.S. Provisional Application No. 62/664,129, filed Apr. 28, 2018, entitled "Continual Audience Synchronization," which is hereby incorporated by reference in its entirety.

TECHNICAL FIELD

Examples described herein relate to software as a service automation, and more specifically, to a system and method for continual audience synchronization.

BACKGROUND

Marketing automation is a category of technology that allows companies to streamline, automate, and measure marketing tasks and workflows so they can increase operational efficiency and grow revenue faster. Marketing automation helps marketers streamline their lead generation, segmentation, lead nurturing and lead scoring, customer lifecycle marketing, cross-sell and up-sell, customer retention, and marketing return on investment measurement. It allows marketers to integrate marketing initiatives and keep track of leads as they progress through the marketing funnel.

BRIEF DESCRIPTION OF THE DRAWINGS

FIG. 4A describes an example method of continually synchronizing updates to a targeted list of people, in accordance with some aspects.

FIG. 4B describes an example method of continually synchronizing updates to a targeted list of people, in accordance with further aspects.

DETAILED DESCRIPTION

Figure 1:
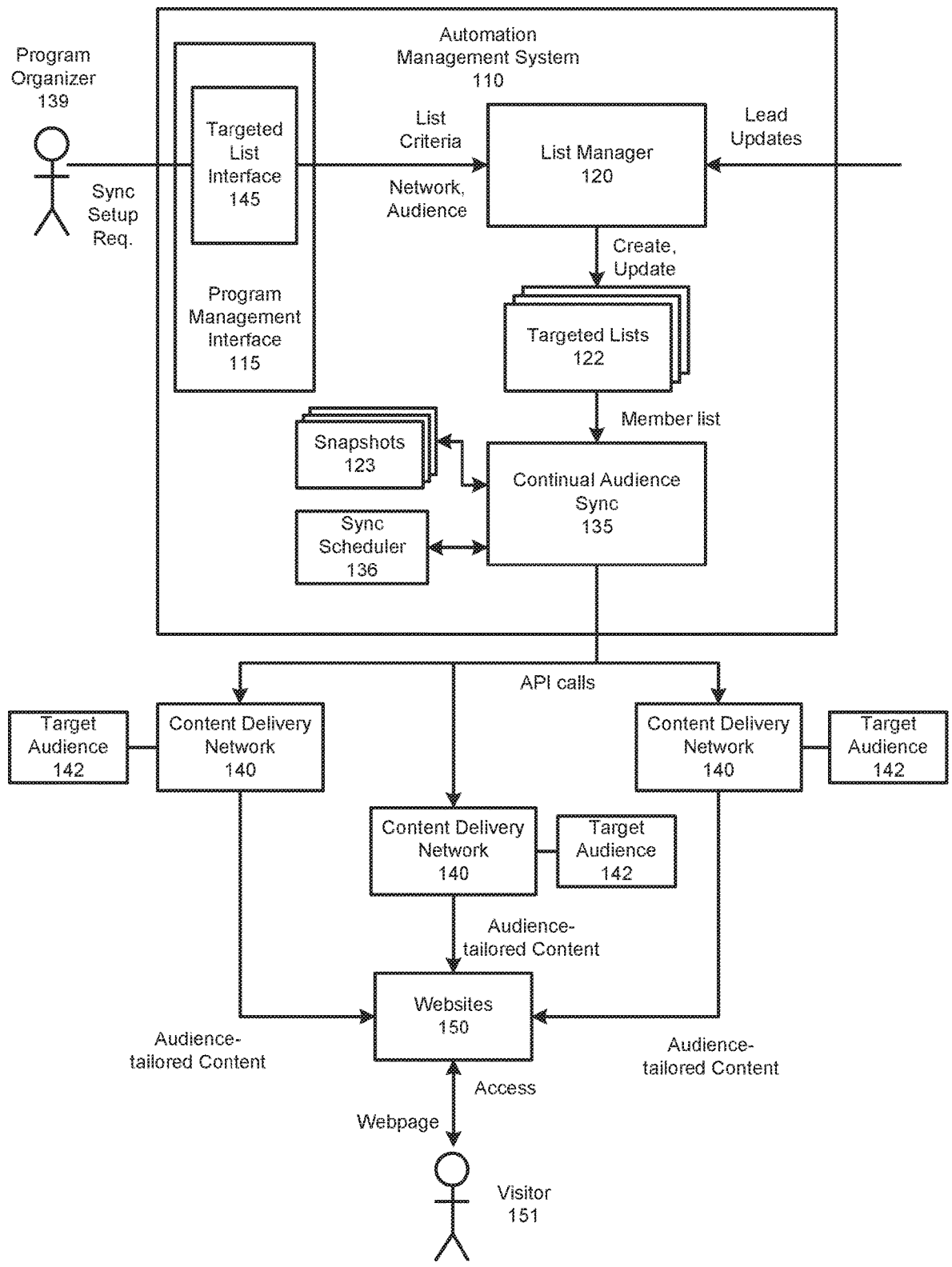
FIG. 1 illustrates an example automation management system that manages scheduling continual audience synchronization, in accordance with some aspects.

According to examples, an automation management system is provided for enabling creators of audience-personalized content to create a dynamic list of people that automatically updates and synchronizes to various advertisement campaigns across multiple ad networks. Through a continual synchronization system, a user is able to set a filtered, targeted list to continually sync the list of people to the ad networks whenever there is a new update to the membership of the list. This eliminates manual work for the user and also decreases the lag time between lead activities and changes in the audience-personalized content that leads see.

To enable marketers to get more out of their advertising budgets, automation management systems can provide more granular targeting of leads than the broad categorizations offered by paid media systems. However, when leads are targeted using specific criteria, advertisements that might apply to a lead at one time may quickly become irrelevant depending on the lead activity, such as the lead purchasing an item. For example, if a lead is identified as a potential buyer of a vacuum cleaner, the lead may be shown ads for vacuum cleaners. Ideally, the lead would no longer be shown vacuum ads after he or she purchases one, but delays in turning lead activities into updated audience targeting can result in the lead seeing the same no-longer-relevant ads for days or weeks.

Given that paid media networks, such as social media platforms and advertising networks, each have their own application programming interfaces, methods of adding/removing users, and restrictions on updates, such as a minimum number of leads to be added/removed, threshold time between updates, etc., it is challenging to keep audiences on multiple paid media networks up-to-date. Due to these differences, conventional approaches require marketing program organizers to manually push updated lists of leads to the paid media networks in order to update their respective audiences.

Among other benefits, a continual audience synchronization system improves performance of an automation management system by requiring less user interaction. Automatically synchronizing targeted lists to paid media networks across the internet reduces the stress on front-end servers from the user interactions as well as enabling a more efficient back-end process for performing updates in scheduled batches. In addition, continual audience synchronization solves the problem of delivering out-of-date or no-longer-relevant content to visitors of websites or users of internet applications. Instead, creators can target visitors with advertisements for related products to create upsell opportunities.

In one aspect, a continual audience synchronization system receives user input corresponding to criteria to create a targeted list of people. The system receives user input corresponding to a request to synchronize the targeted list of people with a corresponding audience on each of a number of content delivery networks. The system processes updates to add or remove entries from the targeted list of people based on the one or more criteria. In response to processing the updates, the system accesses each of the content delivery networks, through appropriate application programming interfaces, to update each corresponding audience.

When a visitor who matches an entry in the corresponding audience accesses a webpage associated with one of the content delivery networks, the content delivery network selects content associated with the corresponding audience to be presented to the visitor and presents the selected content to the visitor as part of the webpage.

In some aspects, the system stores a snapshot of the targeted list of people, and updating each corresponding audience includes transmitting a request to the corresponding content delivery network to remove entries included in the snapshot and add entries included in the updated targeted list of people.

In further aspects, processing the update includes storing a record of changes made to the targeted list of people, and updating each corresponding audience includes transmitting a request to the corresponding content delivery network to add and/or remove entries based on the record of changes. Further, accessing each of the plurality of content delivery networks to update each corresponding audience is performed according to an update schedule for accessing each of the plurality of content delivery networks.

In some aspects, the plurality of content delivery networks include one or more social media platforms or advertising networks, the targeted list of people comprises a subset of entries in a lead database, and/or the content is an advertisement.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 illustrates an example automation management system that manages targeted lists of people and the continual synchronization of those lists with corresponding audiences on content delivery networks, in accordance with some aspects. The automation management system 110 allows program organizers 139 to create a list of marketing leads based upon attributes (including demographic, firmographic, or behavioral attributes), choose an advertisement network audience (e.g., social media network) with which to synchronize the list for the purpose of re-targeting members of list with advertisement campaigns, and enable the system to synchronize recurring updates to the list of leads to the advertising network audience based upon changes to the marketing list. In some aspects, the automation management system 110 includes a list manager 120, targeted lists 122, a continual audience synchronization component 135, snapshots 123, a sync scheduler 136, a program management interface 115, and targeted list interface 145. In addition, an example automation management system 110 can include other components and functionality not illustrated for the sake of simplicity.

In some aspects, the automation management system 110 represents a software platform implementing technologies for marketing departments and organizations to more effectively reach consumers across multiple channels online (such as email, social media, websites, etc.) and automate repetitive tasks. Marketing departments, consultants, and employees benefit by specifying criteria and outcomes for tasks and processes that are interpreted, stored, and executed by software, which increases efficiency and reduces human error. Marketing automation refers to a broad range of automation and analytical tools for marketing that can be used as a hosted or web-based solution. Accordingly, in some aspects, the automation management system 110 does not require software installation. Instead, users such as program organizers 139 can access the automation management system 110 over a network through web-based interfaces such as the program management interface 115 in order to plan, coordinate, manage, and measure their marketing initiatives.

As used herein, a program represents a single one of these marketing initiatives. In some implementations, programs act as organizational containers filled with two main types of assets that enable the program to work: customizable content (emails, webpages, forms, images, etc.) and campaigns—the automated marketing logic that tells the program what to do. In the context of continual audience synchronization, the content includes advertisements to display to people, and the campaigns include targeted lists of leads that meet criteria specified by the program organizer 139.

Leads are people or companies who may have an interest in a firm's products or services. Marketing departments receive new leads through marketing activities such as website visits, online or traditional advertisements, webinars, and other marketing campaigns. Depending on the reach of these marketing campaigns, millions of leads may be generated through different marketing channels. The management of this large body of leads—to keep track of them, to identify the potential customers to nurture, to identify the high-quality ones as opportunities, among other activities—is time-consuming and error-prone.

An automation management system 110 helps a marketer manage this large quantity of leads. Marketing activities associated with the leads include marketing actions as well as actions taken by sales staff—i.e., sales emails, phone calls, online meeting, demos, customer visits, etc. They also include activities originated by the leads themselves, such as web site visits and form fill-outs, both before and after the leads reach the opportunity stage.

In some aspects, forms that leads fill out, details recorded during phone calls, and online interactions are provided to the automation management system 110. For example, a lead can fill out a form and submit the form back to a web server associated with the automation management system 110. In other aspects, data are first entered into other databases such as customer relationship management (CRM) systems and then imported into the automation management system 110 through one or more interfaces (not illustrated).

The automation management system 110 can store a database of leads with information about each lead. The database can include fields that identify and define the lead such as their name, email address, age, gender, city, company name, job title, industry, lead source, etc. The database can also include records of lead interactions with various marketing activities and records of lead interests, brand preferences, etc.

Targeted lists (also referred to as smart lists or filtered lists) allow users such as program organizers 139 to use one or more criteria as filters in order to find specific groups of people and organize a database of leads based on designated characteristics. For example, a program organizer 139 can generate a targeted list that includes all leads in the database who have visited the pricing page on their business's website. Since the automation management system 110 continually updates each targeted list, the program organizer 139 or anyone else with permission can access the targeted list again at a different time for current data about who is visiting that pricing page.

As used herein, content delivery networks 140 represent paid media systems, including social networking platforms such as Facebook™ and LinkedIn™, and advertising platforms such as Google AdWords™. In some implementations, administrators such as the program organizer 139 can grant permission for the automation management system 110 to access accounts on the content delivery networks 140, through application programming interfaces supported by the content delivery networks 140, in order to manage marketing campaigns on those networks.

In some aspects, the automation management system 110 implements functionality to connect lead databases of the program organizer 139 to the content delivery networks 140, enabling the program organizer 139 to run more targeted, personalized digital advertising campaigns. Capabilities can include creating audiences, based on people in the lead databases, on content delivery networks 140 in order to target known leads with personalized advertisements to nurture or reactivate them. In addition, the automation management system 110 can enable the program organizer 139 to segment audiences and audience-tailored content by buyer stage, engagement level, etc., expand audiences to improve acquisition, target email subscribers and non-responders with advertisements, and nurture leads across channels. The automation management system 110 can also ingest leads or data from content delivery networks 140 and upload offline conversion data to content delivery networks 140, optimizing lead acquisition and nurturing efforts. Furthermore, the automation management system 110 can retarget website visitors, using web personalization, to drive visitors back to the website and also personalize advertising efforts by segment or vertical.

In one aspect, the program organizer 139 accesses a targeted list interface 145 on the automation management system 110 in order to create a list of people for a marketing campaign to display advertisements to target audiences 142 on one or more content delivery networks 140. Without the automation management system 110, a program organizer 139 is limited to broad buckets of user audiences (e.g., men in California between 15 and 25 years old) supported by the content delivery networks 140. However, integration with the automation management system 110 enables the program organizer 139 to run a campaign against more granular attributes that are supported by the lead databases in the automation management system 110.

Thus, the program organizer 139 can create a new targeted list or update an existing targeted list to use as the basis for the target audience 142. Through the targeted list interface 145, the program organizer 139 specifies one or more criteria to filter a list of people in the lead databases. These criteria can include demographic information such as gender, age, location, etc. and also lead activity or behaviors such as how many times a lead has visited a certain webpage, whether they're part of a specific account, etc. Once the criteria are specified, a list manager 120 can perform a database query on the lead databases to retrieve records of leads that match the criteria and save the new targeted list 122.

The program organizer 139 can select one or more of the content delivery networks 140 to synchronize the targeted list 122 to. In addition, the program organizer 139 specifies, through the targeted list interface 145, the name of the target audience 142 on each of the selected content delivery networks 140. In some aspects, if a target audience 142 with the entered name does not already exist on the content delivery network 140, the automation management system 110 can create the target audience 142 through an appropriate application programming interface (API).

In addition to specifying the content delivery networks 140, target audiences 142, and targeted list 122, the program organizer 139 can select what advertisement content to serve to the audiences. In some aspects, the program organizer 139 can select content that has already been uploaded to the automation management system 110, or the program organizer 139 can upload new content through the program management interface 115. Depending on the content delivery network 140, the advertisement content can be uploaded to the network as individual ads, or the content can be grouped into one or more ad groups or ad sets. The program organizer 139 can also select from settings including the maximum amount to spend for an ad set, either as a daily budget or a lifetime budget. The program organizer 139 can also set a schedule so ads either run continuously starting immediately or within a selected date range. In some examples and depending on content delivery network 140 implementation, the program organizer 139 can choose to bid for objectives, clicks, or impressions, which determines payment methods. The program organizer 139 may also direct where advertising content appears on a webpage served to visitors, such as a top banner or side of the page.

For each of the specified content delivery networks 140, a continual audience synchronization component 135 can access the content delivery network 140 through that network's API in order to upload entries on the targeted list 122 to the target audience 142. Depending on the implementation of the content delivery network 140, targeted list 122 entries may be matched to user accounts of the content delivery network 140 based on user-identifying information such as email address, first name, last name, address, etc. If some leads on the targeted list 122 are not recognized by the content delivery network 140 (e.g., that lead does not have an account with the network), that lead may be excluded from the target audience 142. Given that leads may have accounts with some but not all of the content delivery networks 140, the target audiences 142 may each include different people from the targeted list 122. However, rather than maintaining separate lists for each content delivery network 140, a targeted list 122 can act as a single source of truth for the target audiences 142.

As leads, such as a visitor 151, interact with various marketing channels, including websites 150, emails, events, etc., the marketing channels can provide lead updates back to lead databases associated with the automation management system 110. As a continuous or scheduled process, the list manager 120 can then update the targeted list 122 as necessary when the lead updates change the list of people who meet the criteria originally specified by the program organizer 139. For example, if the targeted list 122 being synchronized with the target audiences 142 is a list of leads who have visited a pricing webpage in the past ten days, then new people visiting the pricing webpage would meet the criteria and be added to the targeted list 122. Similarly, the list manager 120 would remove a lead on the targeted list 122 once it has been more than ten days since the lead's last visit to the pricing page.

In order to maintain synchronization between the targeted list 122 and each of the target audiences 142 on the content delivery networks 140, the continual audience sync 135 pushes updates to the target audiences 142 on schedules dictated by the policies and limitations of the networks themselves. For example, a content delivery network 140 may only allow an update to a target audience 142 every six hours. In that case, a sync scheduler 136 can delay any updates for that network for six hours after a previous update. Among other limitations, a content delivery network 140 may require that any request to add or remove members from a target audience 142 meets a threshold number of people (e.g., 1000 people).

In one implementation, continual audience sync 135 saves timestamped snapshots 123 of each targeted list 122 that is being synchronized to a target audience 142. In response to the list manager 120 processing lead updates and changing the membership of the targeted list 122, continual audience sync 135 contacts each of the content delivery networks 140 to update the target audiences 142, subject to any schedule limitations. The continual audience sync 135 makes an API call to remove, from the target audience 142, each of the people on the snapshot 123 of the last update made to that network. Next, the continual audience sync 135 makes an API call to add, to the target audience 142, each of the people on the updated version of the targeted list 122. In this way, a small number of people can be added or removed from the target audience 142 even if the content delivery network 140 imposes a minimum threshold number of people to add or remove at once.

In another implementation, the continual audience sync 135 can store a record of changes made to the targeted list 122. If a content delivery network 140 does not impose any publish frequency limitations, the continual audience sync 135 can add or remove people from the target audience 142 in real-time or near real-time. If the content delivery network 140 limits the time between accepting updates, the continual audience sync 135 can combine the records of changes then add and/or remove the appropriate people from the target audience 142 once enough time has elapsed since the previous update to that network.

In some aspects, the targeted list interface 145 can display the sync status of each targeted list 122 and target audience 142 to the program organizer 139. In addition, the continual audience sync 135 can maintain a sync log history to display to the program organizer 139 on the targeted list interface 145.

When a visitor 151 visits a website 150 corresponding to one of the content delivery networks 140 (e.g., a site with ads served by the network, or a site maintained by the content delivery network 140 itself), the content delivery network 140 determines whether the visitor 151 matches an entry in the list of people who make up the target audience 142. If so, the content delivery network 140 selects content associated with the corresponding audience to be presented to the visitor, and the website 150 presents the selected content to the visitor as part of the webpage. For example, the content can be one of the advertisements that the program organizer 139 uploaded as part of an ad campaign targeting that target audience 142. In addition, the website 150 can imbed a hyperlink to the advertisement into the webpage source code according to the options chosen by the program organizer 139. For example, the advertisement may be set to be shown as a banner ad along the top of the webpage.

Methodology

Figure 2:
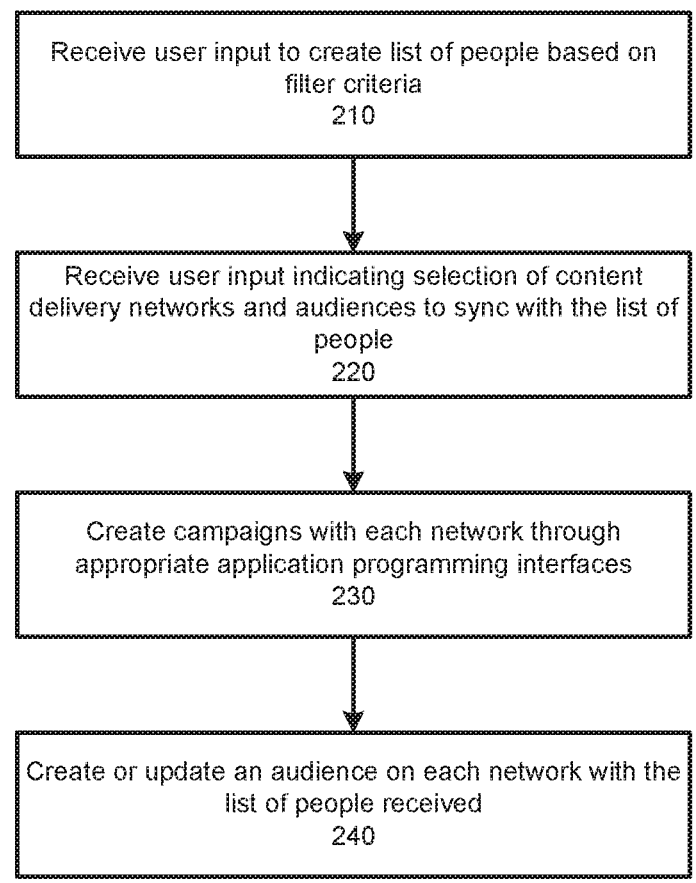
FIG. 2 describes an example method of initially synchronizing a targeted list of people to audiences on content delivery networks, in accordance with some aspects.
Figure 3:
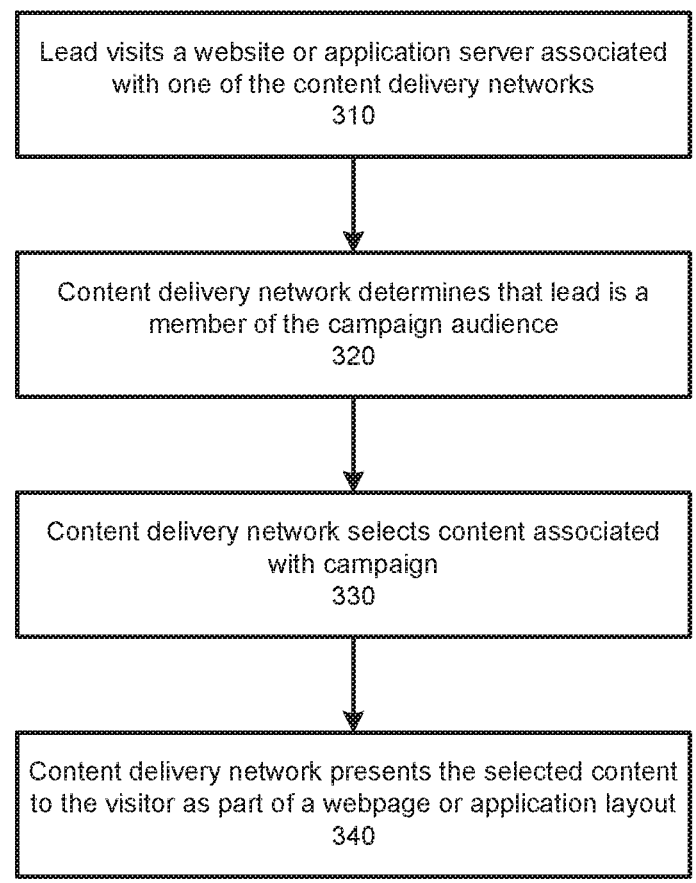
FIG. 3 describes an example method of serving audience-tailored content to visitors on the synchronized list of people, in accordance with some aspects.

FIG. 2 describes an example method of initially synchronizing a targeted list of people to audiences on content delivery networks, in accordance with some aspects. FIG. 3 describes an example method of serving audience-tailored content to visitors on the synchronized list of people, in accordance with some aspects. FIG. 4A describes an example method of continually synchronizing updates to a targeted list of people, in accordance with some aspects. FIG. 4B describes an example method of continually synchronizing updates to a targeted list of people, in accordance with further aspects.

While operations of these methods are described below as being performed by specific components, modules or systems of automation management system 110, it will be appreciated that these operations need not necessarily be performed by the specific components identified, and could be performed by a variety of components and modules, potentially distributed over a number of machines. Accordingly, references may be made to elements of automation management system 110 for the purpose of illustrating suitable components or elements for performing a step or sub step being described. Alternatively, at least certain ones of the variety of components and modules described in automation management system 110 can be arranged within a single hardware, software, or firmware component. It will also be appreciated that some of the steps of this method may be performed in parallel or in a different order than illustrated.

With reference to FIG. 2, in some aspects, an automation management system receives user input to create a list of people based on filter criteria (210). Targeted lists (also referred to as smart lists or filtered lists) allow users to use one or more criteria as filters in order to find specific groups of people and organize a database of leads based on designated characteristics. For example, a program organizer can generate a targeted list that includes all leads in the database who have visited the pricing page on their business's website.

The automation management system further receives user input indicating selection of content delivery networks and audiences to sync with the list of people (220). The user can select one or more content delivery networks to synchronize the targeted list of people to. In addition, the program organizer specifies the name of the target audience on each of the selected content delivery networks.

The automation management system creates campaigns with each network through appropriate application programming interfaces (230). In some aspects, the program organizer can select content for the campaign that has already been uploaded to the automation management system, or the program organizer can upload new content through the program management interface. Depending on the content delivery network, the advertisement content can be uploaded to the network as individual ads, or the content can be grouped into one or more ad groups or ad sets.

The automation management system creates or updates an audience on each network with the list of people received (240). For each of the specified content delivery networks, a continual audience synchronization component can access the content delivery network through that network's API in order to upload entries on the targeted list to the target audience. Depending on the implementation of the content delivery network, targeted list entries may be matched to user accounts of the content delivery network based on user-identifying information such as email address, first name, last name, address, etc. If some leads on the targeted list are not recognized by the content delivery network (e.g., that lead does not have an account with the network), that lead may be excluded from the target audience.

With reference to FIG. 3, in some aspects, a lead visits a website or application server associated with one of the content delivery networks (310). For example, the website may be a site with ads served by the content delivery network or a site maintained by the content delivery network itself.

The content delivery network determines that lead is a member of the campaign audience (320). In some aspects, the content delivery network determines whether the visitor matches an entry in the list of people who make up the target audience.

If the lead is part of the target audience, the content delivery network then selects content associated with campaign (330). For example, the content can be one of the advertisements that the program organizer uploaded as part of an ad campaign targeting that target audience.

The content delivery network or website presents the selected content to the visitor as part of a webpage or application layout (340). In one aspect, the website can imbed a hyperlink to the advertisement into the webpage source code according to the options chosen by the program organizer. For example, the ad may be set to be shown as a banner ad along the top of the webpage.

With reference to FIG. 4A, in one implementation of continual audience synchronization, the automation management system receives updated information for leads (410). As leads interact with various marketing channels including websites, emails, events, etc., the marketing channels can provide lead updates back to the automation management system lead databases.

The automation management system adds and/or removes leads from the filtered list of people based on the updated information (420). As a continuous or scheduled process, the automation management system can update the targeted list as necessary when the lead updates change the list of people who meet the criteria originally specified by the program organizer. For example, if the targeted list being synchronized with the target audiences is a list of leads who have visited a pricing webpage in the past ten days, then new people visiting the pricing webpage would meet the criteria and be added to the targeted list. Similarly, the list manager would remove a lead on the targeted list once it has been more than ten days since the lead's last visit to the pricing page.

Upon determining that a threshold time for update with a network has been reached (425), the automation management system performs application programming interface calls to update the corresponding audience to reflect the new list of people (430). In order to maintain synchronization between the targeted list and each of the target audiences on the content delivery networks, the automation management system pushes updates to the target audiences on schedules dictated by the policies and limitations of the networks themselves. For example, a content delivery network may only allow an update to a target audience every six hours. In that case, a sync scheduler can delay any updates for that network for six hours after a previous update. Among other limitations, a content delivery network may require that any request to add or remove members from a target audience meets a threshold number of people (e.g., 1000 people).

In response to processing lead updates and changing the membership of the targeted list, the automation management system contacts each of the content delivery networks to update the target audiences, subject to any schedule limitations. The continual audience sync makes an API call to remove, from the target audience, each of the people on the snapshot of the last update made to that network. Next, the continual audience sync makes an API call to add, to the target audience, each of the people on the updated version of the targeted list. In this way, a small number of people can be added or removed from the target audience even if the content delivery network imposes a minimum threshold number of people to add or remove at once. The automation management system can then store a snapshot of the current list of people synchronized to content delivery networks (440).

With reference to FIG. 4B, in an alternative implementation of continual audience synchronization, the automation management system receives updated information for leads (450) and adds and/or removes leads from the filtered list of people based on the updated information (460).

The automation management system stores a record of changes made to the filtered list of people (470).

Upon determining that a threshold time for update with a network has been reached (475), the automation management system performs application programming interface calls to add and/or remove leads from the network audience based on recorded changes since the last update to that network (480). If a content delivery network does not impose any publish frequency limitations, the automation management system can add or remove people from the target audience in real-time or near real-time. If the content delivery network limits the time between accepting updates, the automation management system can combine the records of changes then add and/or remove the appropriate people from the target audience once enough time has elapsed since the previous update to that network.

Figure 5:
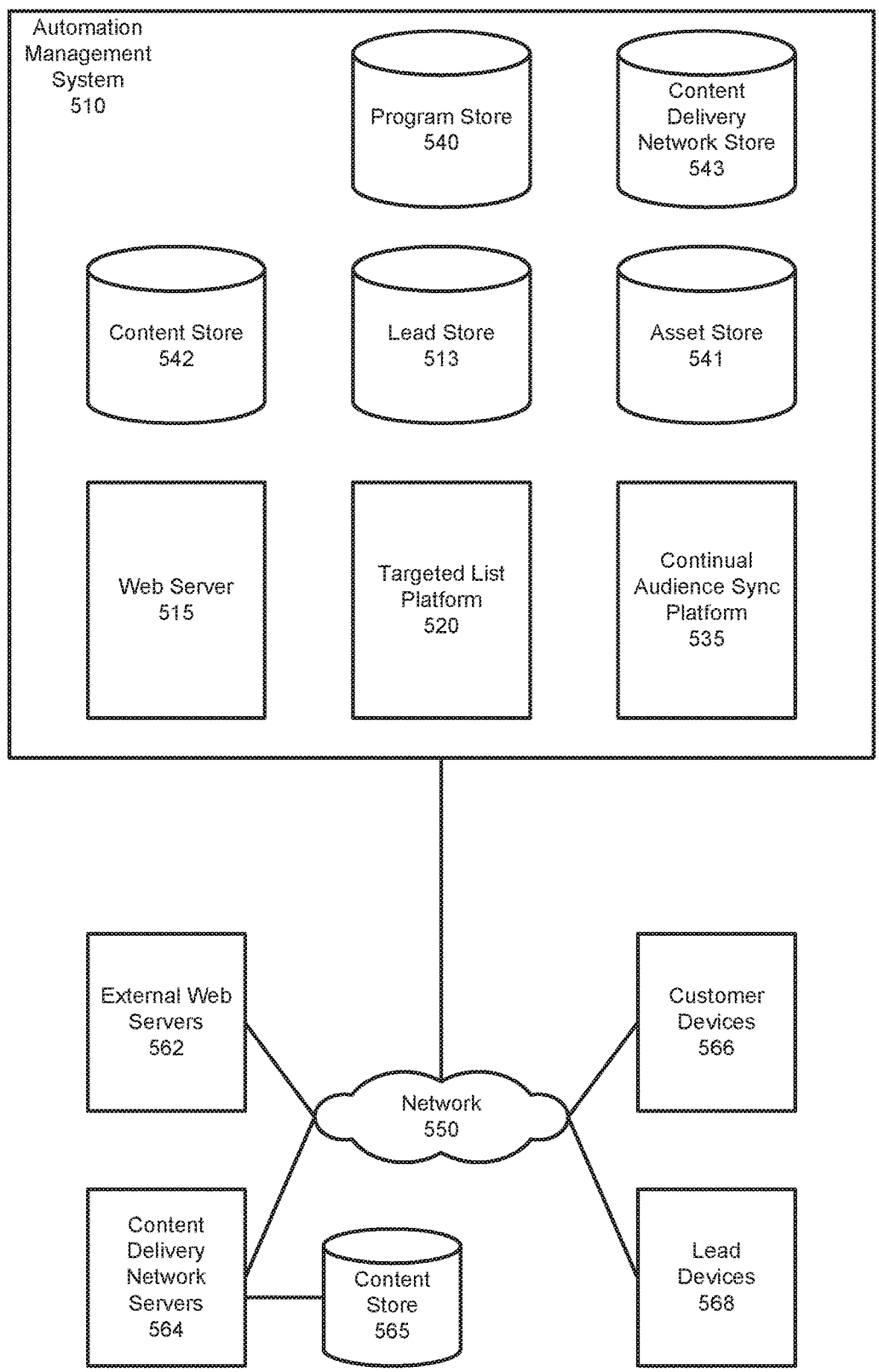
FIG. 5 illustrates example computer systems for an automation management system in communication with other networked systems.

FIG. 5 illustrates example computer systems for an automation management system 510 in communication with other networked systems such as external web servers 562, content delivery network servers 564, customer devices 566, and lead devices 568.

User devices, including customer devices 566 and lead devices 568, comprise one or more computing devices that can receive user input and can transmit and receive data via the network 550. In one aspect, a user device is a conventional computer system executing, for example, a Microsoft Windows-compatible operating system (OS), Apple OS X, and/or a Linux distribution. In another aspect, the user device can be a device having computer functionality, such as a personal digital assistant (PDA), mobile telephone, smart-phone, etc. The user device is configured to communicate via network 550. The user device can execute an application, for example, a browser application that allows a user of the user device to interact with the automation management system 510. In another aspect, the user device interacts with the automation management system 510 through an application programming interface (API) that runs on the native operating system of the user device, such as iOS and ANDROID.

In one aspect, the network 550 uses standard communications technologies and protocols. Thus, the network 550 can include links using technologies such as Ethernet, 802.11, worldwide interoperability for microwave access (WiMAX), 3G, 4G, CDMA, digital subscriber line (DSL), etc. Similarly, the networking protocols used on the network 550 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 550 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

The web server 515 links the automation management system 510 via the network 550 to one or more user devices; the web server 515 serves web pages, as well as other web-related content, such as Java, Flash, XML, and so forth. The web server 515 may provide the functionality of receiving and routing messages between the automation management system 510 and the user devices, for example, instant messages, queued messages (e.g., email), text and SMS (short message service) messages, or messages sent using any other suitable messaging technique. The user can send a request to the web server 515 to upload information, for example, images or videos that are stored in an asset store 541. Lead details and relevant data and metadata regarding the leads are stored in a lead store 513 with the automation management system 510. The user can also create assets such as targeted lists that are stored in the asset store 541. In addition, the user can enter marketing program data into the automation management system 510 through the web server 515 to be stored in a program store 540. The automation management system 510 can also include a content delivery network store 543 to store settings, such as threshold limits on update times and number of audience members to be changed at a time, specific to individual content delivery networks. Lead store 513, asset store 541, program store 540, content delivery network store 543, and other stores can be implemented as one or more relational databases, collections of structured files such as XML files, flat plain text files, or any other method of data storage. In some aspects, automation management system 510 is a software as a service (SaaS) platform that users access through the web server 515. Additionally, the web server 515 may provide API functionality to send data directly to native user device operating systems, including iOS, Android, webOS, and Windows, among others.

A targeted list platform 520 implements functionality to receive and store information and configuration settings for targeted lists. In addition, the targeted list platform 520 can listen for events generated from web server 515, CRM systems, and other sources and execute scripts and other functionality associated with creating and updating targeted lists.

In one aspect, information may be manually inputted into the automation management system 510 through a user interface. In another aspect, information about marketing activities may be gathered by the automation management system 510 or transmitted through application programming interface (API) calls to external web servers 562 and content delivery network servers 564. In a further aspect, the automation management system 510 can use a SOAP (Simple Object Access Protocol) or REST (REpresentation State Transfer) API to receive the information. In a further aspect, web pages served by external web servers 562 can include programming (e.g., javascript code embedded in the HTML) that transmits the information back to the automation management system 510.

In some aspects, the continual audience sync platform 535 provides accesses content delivery networks, through application programming interfaces, to update each corresponding audience based on updates received for a targeted list of people being synchronized to the networks.

The automation management system 510 can also store content, such as advertisements, in a content store 542. This content can be sent to the content delivery network servers 564 and also stored in a content store 565 with each of the servers in order to serve the content to visitors to the websites associated with each of the content delivery networks. Depending on the content delivery network, the advertisement content can be uploaded and stored in the content store 565 as individual ads, or the content can be grouped into one or more ad groups or ad sets.

Computer System

Figure 6:
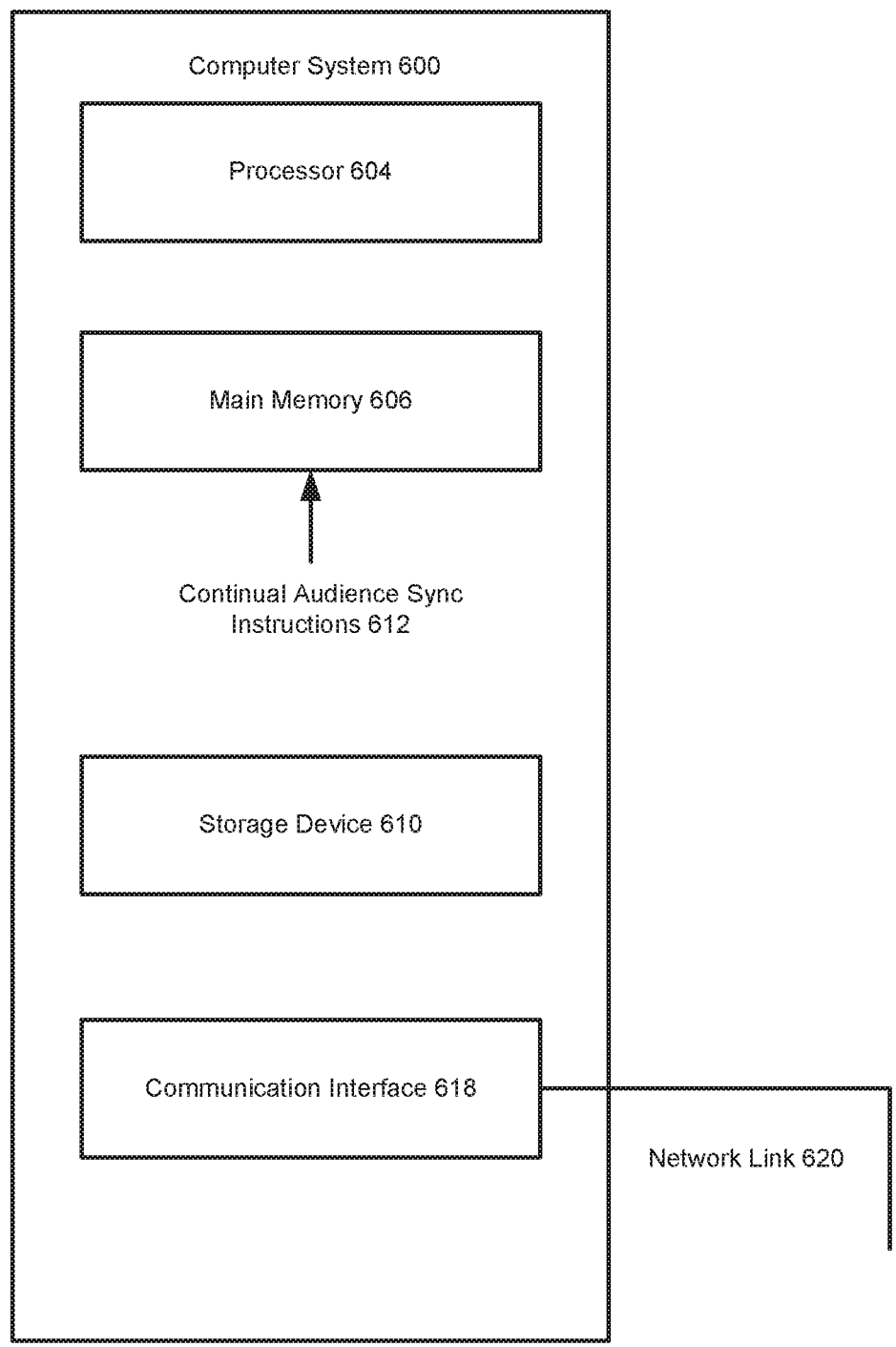
FIG. 6 illustrates a computer system upon which aspects described herein may be implemented.

FIG. 6 is a block diagram that illustrates a computer system upon which aspects described herein may be implemented. For example, in the context of FIG. 1, automation management system 110 may be implemented using one or more servers such as described by FIG. 6.

In an aspect, computer system 600 includes processor 604, memory 606 (including non-transitory memory), storage device 610, and communication interface 618. Computer system 600 includes at least one processor 604 for processing information. Computer system 600 also includes the main memory 606, such as a random access memory (RAM) or other dynamic storage device, for storing information and instructions to be executed by processor 604. Main memory 606 also may be used for storing temporary variables or other intermediate information during execution of instructions to be executed by processor 604. Computer system 600 may also include a read only memory (ROM) or other static storage device for storing static information and instructions for processor 604. The storage device 610, such as a magnetic disk or optical disk, is provided for storing information and instructions such as continual audience sync instructions 612. The communication interface 618 may enable the computer system 600 to communicate with one or more networks through use of the network link 620 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

Examples described herein are related to the use of computer system 600 for implementing the techniques described herein. According to one aspect, those techniques are performed by computer system 600 in response to processor 604 executing one or more sequences of one or more instructions contained in main memory 606. Such instructions (e.g., continual audience sync instructions 612) may be read into main memory 606 from another machine-readable medium, such as storage device 610. Execution of the sequences of instructions contained in main memory 606 causes processor 604 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A system for network content delivery comprising:
one or more processors; and
one or more memory resources storing instructions that, when executed by the one or more processors, cause the system to:
identify digital content distribution criteria, a targeted list of users corresponding to a plurality of lead devices, and a plurality of content delivery networks;
synchronize the targeted list of users with a plurality of targeted digital audiences of the plurality of content delivery networks by transmitting the targeted list of users via corresponding application programming interfaces of the plurality of content delivery networks;
identify online channel lead interactions of the plurality of lead devices corresponding to the targeted list of users and additional online channel lead interactions of a set of additional users corresponding to additional lead devices;
generate an updated targeted list of users by comparing the digital content distribution criteria, the online channel lead interactions, and the additional online channel lead interactions; and
automatically synchronize the plurality of content delivery networks utilizing timestamped snapshots of the updated targeted list of users with the plurality of targeted digital audiences of the plurality of content delivery networks by transmitting the timestamped snapshots of the updated targeted list of users via the corresponding application programming interfaces of the plurality of content delivery networks prior to satisfying a threshold number of users corresponding to lead devices to add or remove from the targeted list of users at the plurality of content delivery networks.

2. The system of claim 1, further comprising instructions that, when executed by the one or more processors, cause the system to select, based on user input via a targeted device list interface of an administrator device, targeted digital audiences for each of the plurality of content delivery networks.

3. The system of claim 1, further comprising instructions that, when executed by the one or more processors, cause the system to automatically synchronize the plurality of content delivery networks by causing a first content delivery network to transmit digital content to a target user corresponding to a target lead device while accounting for activities of the target user with a second content delivery network.

4. The system of claim 1, further comprising instructions that, when executed by the one or more processors, cause the system to transmit a request to the plurality of content delivery networks to remove entries included in the timestamped snapshots of the updated targeted list of users.

5. The system of claim 1, further comprising instructions that, when executed by the one or more processors, cause the system to:
identify, based on user input via a targeted device list interface of an administrator device, an additional targeted list that differs from the targeted list of users;
select, based on an additional user input via the targeted device list interface, a first content delivery network and a second content delivery network of the plurality of content delivery networks;
synchronize the targeted list of users with a first set of the plurality of targeted digital audiences corresponding to the first content delivery network; and
synchronize an additional targeted list with a second set of the plurality of targeted digital audiences corresponding to the second content delivery network.

6. The system of claim 1, further comprising instructions that, when executed by the one or more processors, cause the system to synchronize the targeted list of users with the plurality of targeted digital audiences by:
accessing, via the corresponding application programming interfaces, user account data of the plurality of content delivery networks;
identifying one or more users from the targeted list of users corresponding to the plurality of lead devices that fail to match with one or more user accounts for the plurality of content delivery networks based on the user account data; and
excluding the one or more users from synchronizing to the plurality of targeted digital audiences of the plurality of content delivery networks.

7. The system of claim 1, further comprising instructions that, when executed by the one or more processors, cause the system to:
access, via the corresponding application programming interfaces, at least one content delivery network of the plurality of content delivery networks; and
responsive to user input via a targeted device list interface of an administrator device, create a new digital audience for the at least one content delivery network.

8. A method of network content delivery, the method being implemented by one or more processors and comprising:
identifying digital content distribution criteria, a targeted list of users corresponding to a plurality of lead devices, and a plurality of content delivery networks;
synchronizing the targeted list of users with a plurality of targeted digital audiences of the plurality of content delivery networks by transmitting the targeted list of users via corresponding application programming interfaces of the plurality of content delivery networks;
identifying online channel lead interactions of the plurality of lead devices corresponding to the targeted list of users and additional online channel lead interactions of a set of additional users corresponding to additional lead devices;
generating an updated targeted list of users by comparing the digital content distribution criteria, the online channel lead interactions, and the additional online channel lead interactions; and
automatically synchronizing the plurality of content delivery networks utilizing timestamped snapshots of the updated targeted list of users with the plurality of targeted digital audiences of the plurality of content delivery networks by transmitting the timestamped snapshots of the updated targeted list of users via the corresponding application programming interfaces of the plurality of content delivery networks prior to satisfying a threshold number of users corresponding to lead devices to add or remove from the targeted list of users at the plurality of content delivery networks.

9. The method of claim 8, further comprising selecting, based on user input via a targeted device list interface of an administrator device, targeted digital audiences for each of the plurality of content delivery networks.

10. The method of claim 8, further comprising providing, for display within a targeted device list interface, a synchronization status for each of the plurality of targeted digital audiences while synchronizing the targeted list of users.

11. The method of claim 8, further comprising:
determining that a synchronization threshold is satisfied by determining that an update frequency limitation is satisfied; and
upon detecting satisfaction of the synchronization threshold, automatically synchronizing the plurality of content delivery networks.

12. The method of claim 8, further comprising:
identifying, based on user input via a targeted device list interface of an administrator device, an additional targeted list that differs from the targeted list of users;
selecting, based on an additional user input via the targeted device list interface, a first content delivery network and a second content delivery network of the plurality of content delivery networks;
synchronizing the targeted list of users with a first set of the plurality of targeted digital audiences corresponding to the first content delivery network; and
synchronizing an additional targeted list with a second set of the plurality of targeted digital audiences corresponding to the second content delivery network.

13. The method of claim 8, wherein synchronizing the targeted list of users with the plurality of targeted digital audiences comprises:
accessing, via the corresponding application programming interfaces, user account data of the plurality of content delivery networks;
identifying one or more users from the targeted list of users corresponding to the plurality of lead devices that fail to match with one or more user accounts for the plurality of content delivery networks based on the user account data; and
excluding the one or more users from synchronizing to the plurality of targeted digital audiences of the plurality of content delivery networks.

14. The method of claim 8, further comprising:
accessing, via the corresponding application programming interfaces, at least one content delivery network of the plurality of content delivery networks; and
responsive to user input via a targeted device list interface of an administrator device, creating a new digital audience for the at least one content delivery network.

15. A non-transitory computer-readable medium that stores instructions, executable by one or more processors, to cause the one or more processors to:
identify digital content distribution criteria, a targeted list of users corresponding to a plurality of lead devices, and a plurality of content delivery networks;
synchronize the targeted list of users with a plurality of targeted digital audiences of the plurality of content delivery networks by transmitting the targeted list of users via corresponding application programming interfaces of the plurality of content delivery networks;
identify online channel lead interactions of the plurality of lead devices corresponding to the targeted list of users and additional online channel lead interactions of a set of additional users corresponding to additional lead devices;
generate an updated targeted list of users by comparing the digital content distribution criteria, the online channel lead interactions, and the additional online channel lead interactions; and
automatically synchronize the plurality of content delivery networks utilizing timestamped snapshots of the updated targeted list of users with the plurality of targeted digital audiences of the plurality of content delivery networks by transmitting the timestamped snapshots of the updated targeted list of users via the corresponding application programming interfaces of the plurality of content delivery networks prior to satisfying a threshold number of users corresponding to lead devices to add or remove from the targeted list of users at the plurality of content delivery networks.

16. The non-transitory computer-readable medium of claim 15, wherein the one or more processors are configured to select, based on user input via a targeted device list interface of an administrator device, targeted digital audiences for each of the plurality of content delivery networks.

17. The non-transitory computer-readable medium of claim 15, wherein the one or more processors are configured to provide, for display within a targeted device list interface of an administrator device, a synchronization status for each of the plurality of targeted digital audiences while synchronizing the targeted list of users.

18. The non-transitory computer-readable medium of claim 15, wherein the one or more processors are configured to:
determine that a synchronization threshold is satisfied by determining the updated targeted list of users comprises a threshold number of users corresponding to lead devices to add or remove from the targeted list of users; and
upon detecting satisfaction of the synchronization threshold, automatically synchronize the plurality of content delivery networks.

19. The non-transitory computer-readable medium of claim 15, wherein the one or more processors are configured to:
identify, based on user input via a targeted device list interface of an administrator device, an additional targeted list that differs from the targeted list of users;
select, based on an additional user input via the targeted device list interface, a first content delivery network and a second content delivery network of the plurality of content delivery networks;
synchronize the targeted list of users with a first set of the plurality of targeted digital audiences corresponding to the first content delivery network; and
synchronize an additional targeted list with a second set of the plurality of targeted digital audiences corresponding to the second content delivery network.

20. The non-transitory computer-readable medium of claim 15, wherein the one or more processors are configured to synchronize the targeted list of users with the plurality of targeted digital audiences by:
accessing, via the corresponding application programming interfaces, user account data of the plurality of content delivery networks;
identifying one or more users from the targeted list of users corresponding to the plurality of lead devices that fail to match with one or more user accounts for the plurality of content delivery networks based on the user account data; and excluding the one or more users from synchronizing to the plurality of targeted digital audiences of the plurality of content delivery networks.

\* \* \* \* \*